United States Patent [19]
Brown et al.

[11] Patent Number: 5,249,492
[45] Date of Patent: Oct. 5, 1993

[54] VERTICAL TRIM PRESS AND STACKING APPARATUS AND METHOD OF TRIMMING AND STACKING ARTICLES

[75] Inventors: Gaylord W. Brown, Beaverton; James H. Kundinger, Midland; William F. Kent, Beaverton, all of Mich.

[73] Assignee: John Brown Inc., West Warwick, R.I.

[21] Appl. No.: 656,211

[22] Filed: Feb. 15, 1991

[51] Int. Cl.$^5$ .............................................. B26D 7/32
[52] U.S. Cl. .................................... 83/23; 83/85; 83/94; 83/97; 83/147; 414/790.006; 414/790.008
[58] Field of Search .................. 83/23, 81, 82, 85, 86, 83/89, 91, 92, 93, 94, 97, 147, 150, 155, 373; 414/790.6, 790.8

[56] References Cited

U.S. PATENT DOCUMENTS

| | | | |
|---|---|---|---|
| 3,392,853 | 7/1968 | Mitchell et al. | 414/790.6 |
| 3,461,760 | 8/1969 | White | 83/81 |
| 3,525,443 | 8/1970 | Pomara, Jr. | 414/790.6 X |
| 4,108,031 | 8/1978 | Dangelmaier et al. | 83/97 X |
| 4,111,086 | 9/1978 | Dangelmaier | 83/97 X |
| 4,177,702 | 12/1979 | Pazzaglia | 83/89 X |
| 4,313,358 | 2/1982 | Brown | 83/97 |
| 4,391,171 | 7/1983 | Wendt | 83/82 |
| 4,836,070 | 6/1989 | Spano et al. | 83/97 X |

Primary Examiner—Douglas D. Watts
Assistant Examiner—Raymond D. Woods
Attorney, Agent, or Firm—Burnett W. Norton

[57] ABSTRACT

Apparatus and method for severing and stacking articles which have been differentially pressure formed in a sheet of thermoplastic material from the sheet. Apparatus is provided for moving the sheet in a horizontal path and relatively vertically moving opposed upper and lower trim dies into engagement with vertically opposite sides of the sheet to trim the articles from the sheet at a trim station. The articles free fall through an opening in the lower die and free fall to an underlying accumulator. The accumulator includes mechanism which is moveable from a stack forming position in the path of freely falling articles to receive and accumulate freely falling severed articles in a stack, and a releasing position in which a formed the stack is released for vertical free fall. Mechanism is provided for accumulating additional severed articles at a higher predetermined vertical level until the released stack vertically clears the stacking station and then releasing the partial stack for free-fall to the stacking station at which another stack is completed.

22 Claims, 6 Drawing Sheets

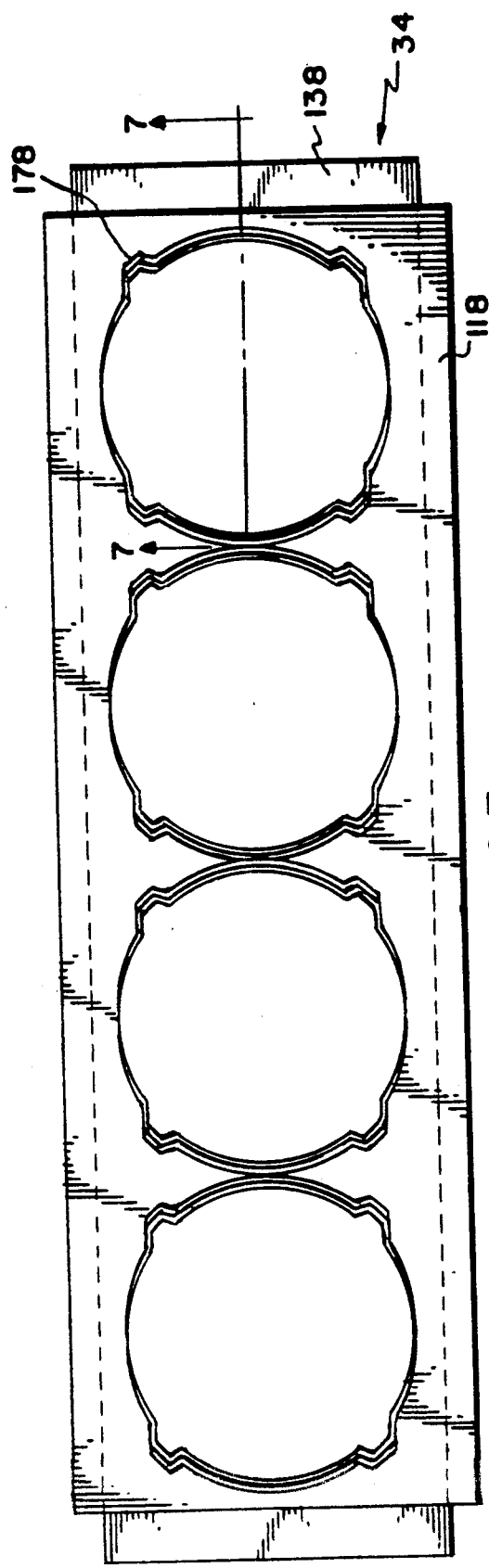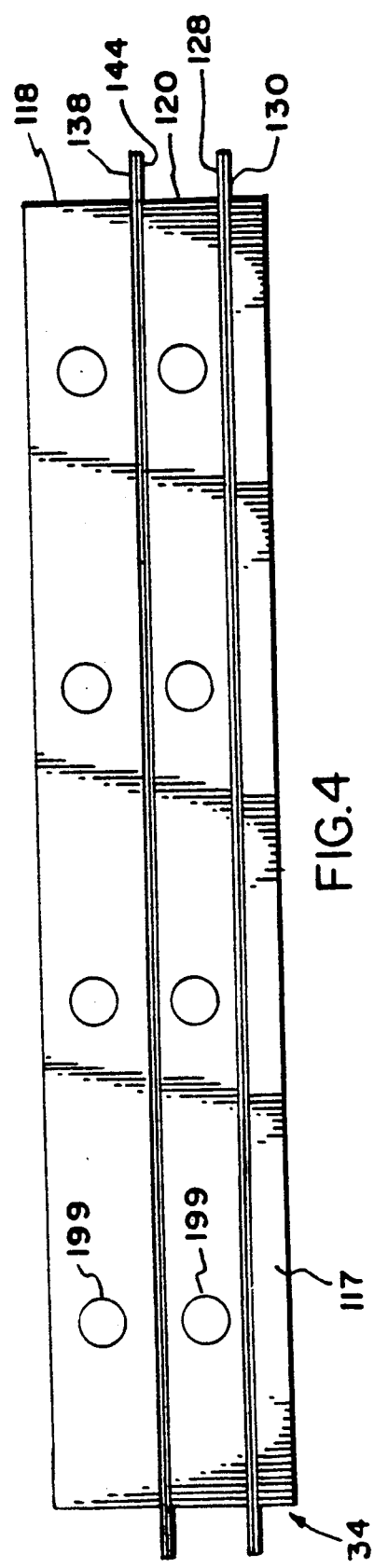

VERTICAL TRIM PRESS AND STACKING APPARATUS AND METHOD OF TRIMMING AND STACKING ARTICLES

BACKGROUND OF THE INVENTION

1. Field of the Invention

This invention relates to apparatus for severing and stacking articles from a sheet of thermoplastic material in which the articles have been differentially pressure formed and more particularly to a trim press which includes relatively vertically movable trim dies which engage vertically opposite sides of a horizontally indexed sheet of thermoplastic material to trim articles from the sheet, and apparatus for receiving and vertically stacking the free falling severed articles.

2. Description of the Prior Art and Objects

Apparatus such as that disclosed in U.S. Pat. No. 3,664,791 granted to G.W. Brown on May 23, 1972, which is incorporated herein by reference, has been provided heretofore for successively delivering a heated thermoplastic sheet to a sheet heating station and then to a forming station at which opposed molds engage the sheet to differentially pressure form articles in the sheet. Apparatus, such as that disclosed in U.S. Pat. No. 4,313,358 issued to G.W. Brown on Feb. 2, 1982 and U.S. Pat. No. 4,391,171 granted to Michael Wendt on Jul. 5, 1983, which are incorporated herein by reference, have been provided for trimming articles from the plastic sheet.

These prior art trim presses include a horizontally disposed, horizontally reciprocally movable trim press which includes a pair of opposed dies which engage and clamp to horizontally opposite sides of a vertical sheet in which the articles are formed. The aforementioned patents disclose ejector mechanism for horizontally ejecting articles severed at a trim station.

The trim presses disclosed in the aforementioned patents are frequently referred to as horizontal trim presses which trim the part from the sheet, push the trimmed part into a stack, count the parts in the stack and then tip the stack 90° to a conveyor for delivery to a shrink wrap machine or the like.

It is difficult to stack some articles with a conventional horizontal trim press because the parts sometimes fall over. As the parts are ejected from the prior art horizontal trim press, they are "on edge" and can tip which interferes with the stacking. It has been found, according to the present invention, that the stacking of severed articles is greatly enhanced if the trim dies are moved vertically and the sheet moved horizontally. Accordingly, it is an object of the present invention to provide a vertical trim press apparatus and method for vertically severing articles from a thermoplastic sheet which is indexed horizontally and then vertically stacking the trimmed articles.

It is another object of the present invention to provide method and apparatus for vertically severing and stacking articles differentially pressure formed in a sheet of thermoplastic material including opposed cooperating trim dies which are moved vertically into engagement with vertically opposite sides of a horizontally disposed sheet of thermoplastic material.

The problem with stacking parts ejected by a prior art horizontal trim press is exacerbated when the user wants to count articles in relatively small quantities. For example, dinner plates are frequently sold in small quantities for "over the counter" retail sales in the range of 8–25 plates per package. Because of the stacking difficulties associated with a horizontal trim press, plate manufacturers would frequently error on the side of having too many articles in a stack. This, of course, is costly. Accordingly, it is an object of the present invention to provide apparatus for severing and stacking articles from a sheet which has been differentially pressure formed in a sheet of thermoplastic material which is consistently accurate.

A further object of the present invention is to provide method and apparatus of the type described including apparatus for interrupting the vertical path of travel of a predetermined number of severed articles and accumulating them in a vertical stack at a predetermined level at a stacking station and releasing the stack for vertical free fall while concurrently accumulating additional severed articles at a slightly higher level to form a successive partial vertical stack and then releasing the partially formed stack to fall to said predetermined level where the balance of the stack is accumulated.

It has been found, according to the present invention, that the severed articles can be stacked in an accumulator including a pair of horizontally disposed bars underlying the trim dies and having vertical apertures therethrough aligned with apertures through the lower trim die. As the severed articles are received by the accumulator, they free fall onto support members which are movable between positions blocking the passage of freely falling articles and non-blocking positions. As the severed articles fall, ambient air underlying the articles laterally escapes outwardly therefrom. To allow the uninhibited free escape of air and not interfere with the free fall of severed articles, air escapement passages are provided in the accumulator bars. The stacking structure constructed according to the present invention eliminates the necessity of ejector mechanism such as that disclosed in the aforementioned patents.

Accordingly, it is a still further object of the present invention to provide vertical trim press apparatus of the type described which eliminates the necessity of ejector mechanism for ejecting articles severed at a trim station.

Yet another object of the present invention is to provide apparatus of the type described which includes an accumulator having air escapement passages which allows the severed articles to freely fall.

Other objects and advantages of the present invention will become apparent to those of ordinary skill in the art as the description thereof proceeds.

SUMMARY OF THE INVENTION

Apparatus and method for severing and stacking articles which have been differentially pressure formed in a thermoplastic sheet from the thermoplastic sheet comprising: a frame; mechanism on the frame for successively horizontally indexing a continuous thermoplastic sheet, having articles formed therein, in a horizontal path of travel to a trim station; upper and lower trim dies mounted on the frame on vertically opposite sides of the sheet at the trim station, for relative vertical movement toward and away from each other between vertically spaced apart positions and closed positions in which the trim dies engage vertically opposite sides of the sheet to sever an article at the trim station; the lower die including a vertical opening therethrough for vertically receiving the articles as they are being trimmed and for passing the articles; and accumulator mechanism disposed below the trim dies for receiving a predetermined number of severed articles and accumulating them to form a stack and then releasing the stack.

BRIEF DESCRIPTION OF THE DRAWINGS

The invention may be more readily understood by referring to the accompanying drawings, in which:

FIG. 3 is an enlarged top plan view of the assembled accumulator, taken along the line 3—3 of FIG. 2;

FIG. 4 is an enlarged front elevational view of the accumulator illustrated in FIG. 3;

DESCRIPTION OF THE PREFERRED EMBODIMENT

Figure 1:
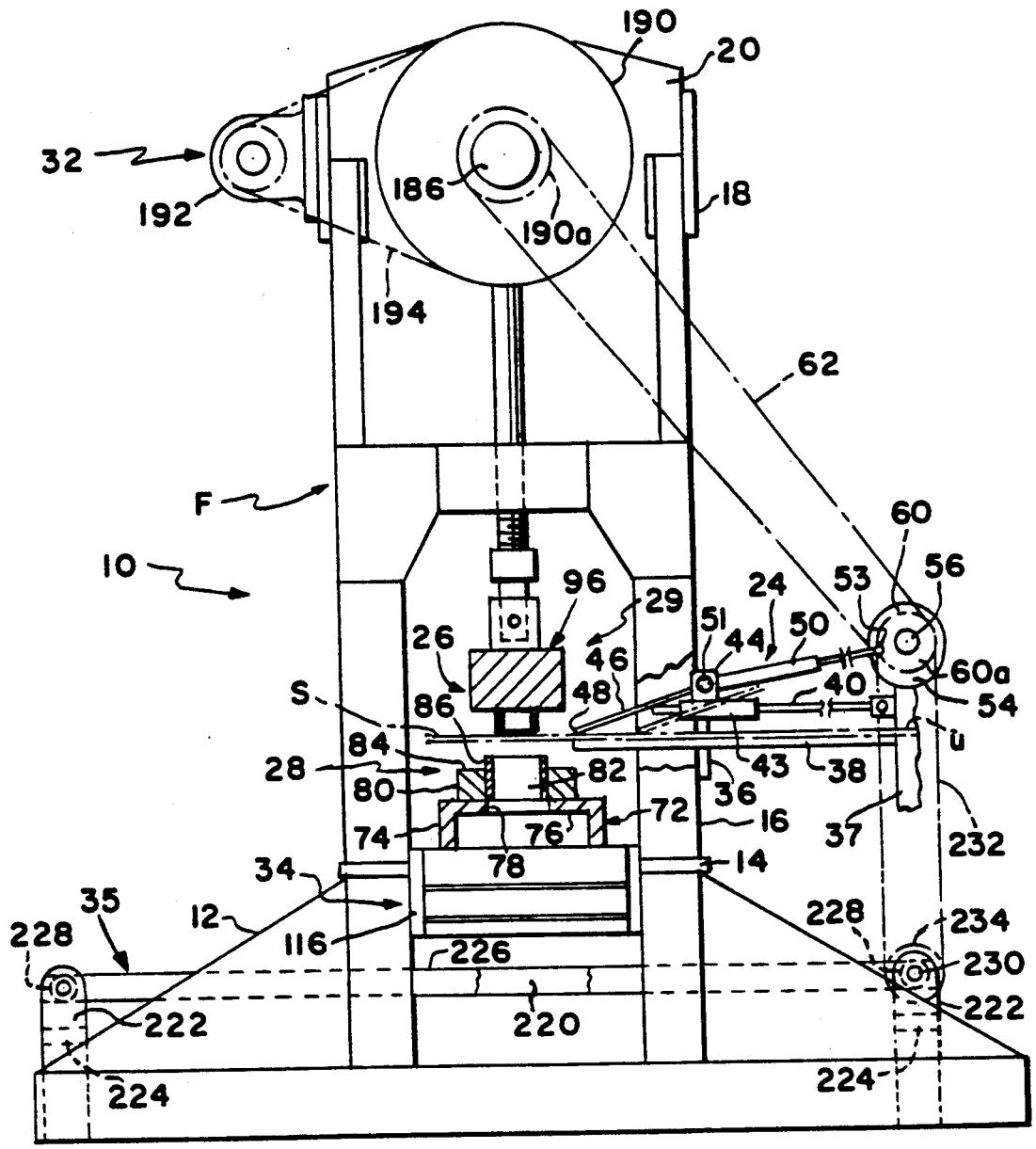
FIG. 1 is a side elevational view illustrating apparatus constructed according to the present invention, parts being broken away in section for purposes of clarity.

Trim press apparatus, constructed according to the present invention, generally designated 10, includes a frame, generally designated F, comprising a pair of laterally spaced apart side plates 12 spanned by cross frame members 14 mounting pairs of vertical end posts 16 which are spanned at their upper ends by lateral braces 18 and side plates 20.

The trim press is particularly adapted for severing and stacking articles, such as containers, generally designated A, which have been differentially pressure formed in a sheet of thermoplastic material, generally designated S, by thermoforming apparatus such as that disclosed in U.S. Pat. No. 3,664,791 granted to G.W. Brown on May 23, 1972, which is incorporated herein by reference. The articles A may suitably comprise thermoformed, thermoplastic lids and the like conventionally used in coffee vending machines and/or dinner plates.

The trim press includes sheet feed mechanism, generally designated 24, for successively horizontally indexing the sheet S to a trim station, generally designated 26. The sheet feed mechanism 24 is operated to successively index the sheets to successively present articles A at the trim station 26.

A pair of opposed lower and upper trim die assemblies, generally designated 28 and 29, are mounted on the frame for trimming the articles A, having a general C, from the sheet S at the trim station 26.

A sheet indexing drive assembly, generally designated 32, is provided for intermittently, horizontally indexing the sheet S and vertically relatively driving the upper trim die assembly 29 in timed relation. An accumulator or stacker, generally designated 34, is provided below the trim station 26 for receiving and stacking the articles A which have been severed. A conveyor, generally designated 35, is disposed below the stacker 34 for receiving stacks of articles and conveying them to a remote location.

THE SHEET SUPPLY

The sheet supply apparatus 24 includes a mounting frame members 36 and cross bar 37 which mount a generally planar, horizontal sheet guide plate 38 upstream of the trim station 26 on which the thermoplastic sheet S rests as it is horizontally moved downstream to the trim station 26.

Apparatus is provided for intermittently horizontally indexing the sheet S along the sheet guide plate 38 and includes a pair of horizontal, sheet guide rods 40, mounted on cross bar 37. Guide sleeves 43, slidably mounted on the guide rods 40, are spanned by a bar 44 having a pair of resilient, yieldable sheet engaging fingers 46 mounted thereon. Fingers 46, which may typically comprise spring steel, include terminal edges 48 which bear against the upper side U of the sheet S.

Apparatus is provided for moving the sleeves 43, the finger mounting cross bar 44, and the engagement fingers 46 horizontally in a to-and-fro path of travel and includes a yoke 50 which is coupled to the finger mounting cross bar 44. One end of the yoke 50 is pivotally coupled via a pin 51 to bar 44 and is journaled, at its opposite end on a pin 53 provided on a crank 54 which is fixed to a shaft 56 journaled in bearing blocks mounted on the cross bar 37. A drive sprocket wheel 60, fixed to the shaft 56, is driven via a timing belt or chain 62. As the crank 54 rotates, the finger mounting cross bar 44 and sheet engaging fingers 46 are moved in a horizontal path between and forward positions, illustrated in solid lines in FIG. 1 and retracted positions illustrated in chain lines in FIG. 1. As the sheet engaging fingers 46 move horizontally downstream, the terminal finger edges 48 will engage the upper sides U of the sheet S to move the sheet S downwardly along the sheet guide backing plate 38 to successively index the sheet S to the trim station 26 and thence downwardly for discharge.

As the sheet engaging fingers 46 move upstream, the fingers 46 will merely escape or slide along the upper surface U of the sheet S which remains in position to which it was previously advanced by the fingers 46.

The lower stationary die assembly, generally designated 28, is more particularly illustrated in U.S. Pat. No. 4,313,358 which is incorporated herein by reference. The die assembly 28 is mounted on a pair of laterally spaced apart vertical, frame bars 64 spanning posts 16. The trim die assembly 28 is stationary and includes a lower platen, generally designated 72, which is generally U-shaped in cross section, as illustrated in FIG. 1, and includes front and rear generally parallel flange members 74 spanned by a generally horizontal base 76 having a laterally extending, elongate slot opening or aperture 78 therethrough.

Figure 11:
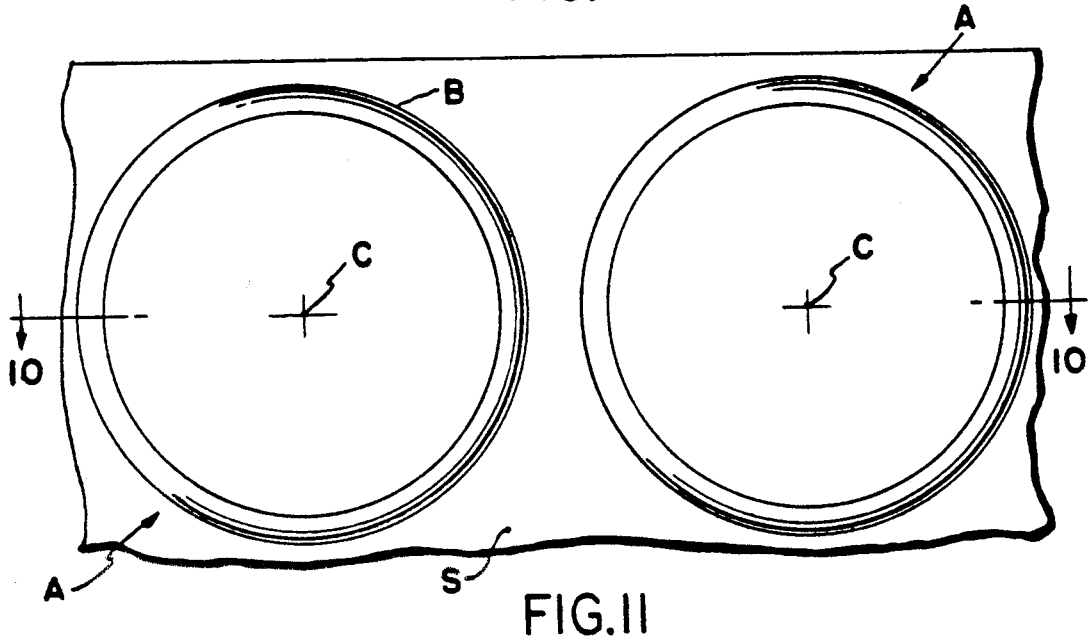
FIG. 11 is a top plan view of the thermoplastic sheet material illustrated in FIG. 10.

Mounted on the base 76 of the lower stationary platen 72 is a stationary trim die 80 including a plurality of laterally spaced apart apertures 82 therethrough in alignment with the slot openings 78. Apertures 82 are spaced apart a distance equal to the distance between the center lines C (FIG. 11) of the adjacent articles A formed in the sheet S.

Mounted on the upper face 84 of the lower stationary die 80 in alignment with each of the apertures 82 is a hollow, generally cylindrical, primary trim die knife 86 having an annular knife edge 88 for engaging the lower side of the sheet S along the circumferential border B of an article A provided in the sheet S. The trim die knife 86 includes a cylindrical passage 90 therethrough which, along with the platen aperture 78, receives the article A as it is being trimmed from the sheet S.

The upper movable trim die assembly 29 includes an upper platen 96 having bushings 98 therethrough slidably mounted on laterally spaced, vertical guide rods 100 projecting upwardly from stationary platen 72.

Figure 9:
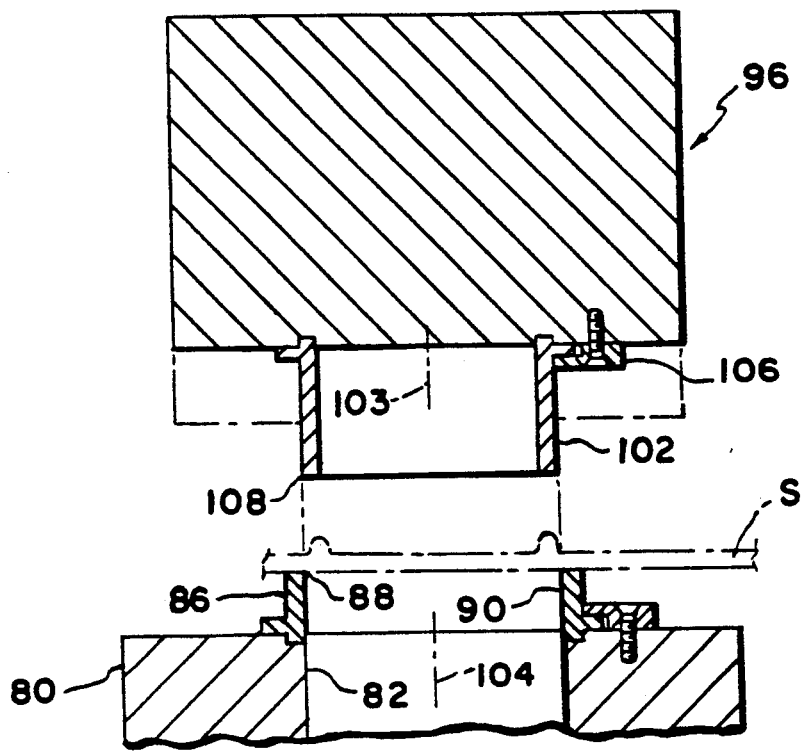
FIG. 9 is a greatly enlarged, sectional side view, more particularly illustrating the die assemblies in spaced apart positions.
Figure 10:
FIG. 10 is an enlarged sectional end view more particularly illustrating a sheet of plastic material having articles thermoformed therein, taken along the line 10—10 of FIG. 11.

The upper movable platen 96 mounts a plurality of upper, hollow cylindrical trim die punches 102 having axes 103 axially aligned with the axes 104 of the lower trim die knives 86. The upper trim die punches 102 are mounted on the lower face of the upper platen 96 via mounting brackets 106. The upper trim die punches 102 each comprise a generally hollow cylinder having an annular knife edge 108 which in the position illustrated in chain lines in FIG. 9, bears against the upper side U of the sheet S and are received in sliding engagement by lower cylindrical die knives 86 after the article A is severed from the sheet S.

The upper die platen 96 is vertically moved in a to-and-fro path relative to the stationary lower die platen 72 via a pair of laterally spaced apart, crank arms 110 pivotally connected to the upper platen 96 via brackets 112 and pins 114.

THE STACKING APPARATUS

The stacker or accumulator, generally designated 34, is mounted on the underside of the lower die assembly 28 via frame supported mounting brackets 116 and a lower frame plate 117. The stacker 34 includes a pair of vertically juxtaposed upper and lower horizontal stacking bars, 118 and 120 respectively. The upper and lower bars 118 and 120 each includes a plurality of laterally spaced apart vertical apertures or bores 122 and 124, respectively, therethrough for receiving and passing free-falling articles A severed at the trim station 26. The bores 122 and 124 include vertical axes 126 which are coaxial with the axes 104 of the lower die passage 90. The distance between the center lines 126 of the stacking passages 122 and 124 is equal to the distance between the center lines 104 of the die passages 90.

Mounted between the lower frame plate 117 and the underside of the lower stacking bar 120, is a first pair of transversely movable upper and lower stacking plates 128 and 130, respectively, having apertures 132 and 134, respectively, therethrough of substantially the same diameter shape and configuration as the apertures 122 and 124. The first pair of stacking plates 128 and 130 are mounted on the flat solid bar 117 which has a plurality of apertures 136 coaxial with, identical to, and vertically aligned with the apertures 122 and 124 of the upper and lower stacking bars 118 and 120.

Disposed between the upper and lower die bars 118 and 120 is a second pair of horizontally reciprocally movable stacking plates 138 and 140 having apertures 142 and 144 respectively therethrough which are substantially identical to the stacking plates 128 and 130 and the bores therethrough.

Figure 7:
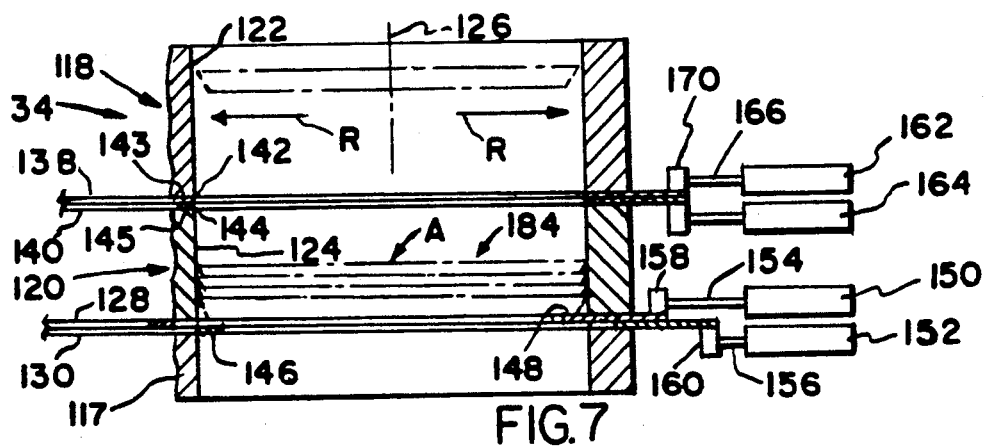
FIG. 7 is an enlarged sectional front view of the accumulator, taken along the line 7—7 of FIG. 3, illustrating the stacking plates in one position.

The first set of plates 128 and 130 are transversely movable between the stacking positions illustrated in FIG. 7 in which the inner marginal portions 146 and 148 of plates 128 and 130, respectively, which surround the bores 132 and 134, respectively, are disposed in the path of the severed articles A which are passing through the bores 124. The plates 128 and 130 are movable between the stacking positions illustrated in FIG. 7 and the stack releasing positions illustrated in FIG. 8 via double acting, pneumatically operated, frame mounted cylinders 150 and 152 respectively having piston rods 154 and 156, respectively, coupled to blocks 158 and 160 respectively which are mounted on plates 128 and 130 respectively. Typically, the cylinders 150 and 152 are oppositely operated to move, for example, the uppermost plate 128 to the left as viewed in FIG. 7 and to move the lowermost plate 130 to the right as illustrated in FIG. 7 to more the plates 128 and 130 from the non-stacking positions to the stacking positions in which the portions 146 and 148 project into the path of the articles A on opposite sides of the bore 124.

Figure 8:
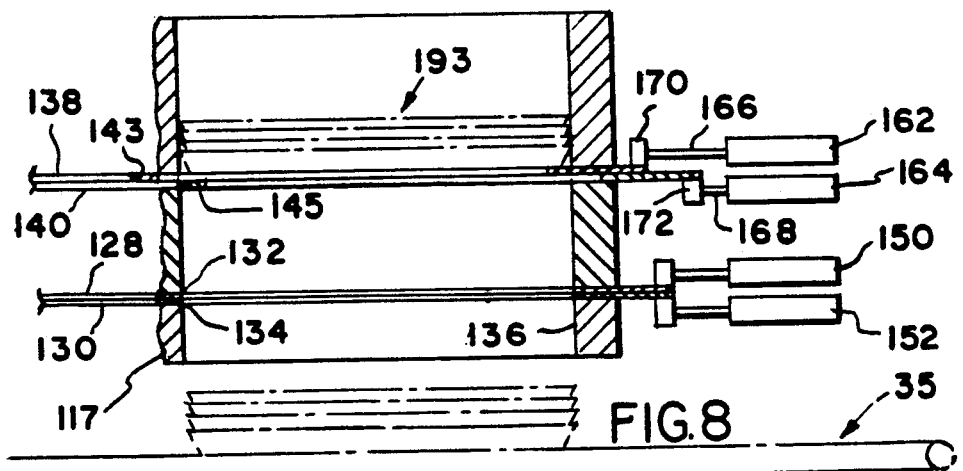
FIG. 8 is a greatly enlarged sectional front view of the accumulator substantially similar to that illustrated in FIG. 7 with the stacking plates in horizontally adjusted positions.

Likewisely, the second set of upper and lower plates 138 and 140 are laterally transversely movable between the non-stacking positions, illustrated in FIG. 7, and the stacking positions, illustrated in FIG. 8, via a pair of double acting pneumatically operated frame supported cylinders 162 and 164 having piston rods 166 and 168 respectively coupled to blocks 170 and 172, respectively, fixed to the plates 138 and 140, respectively. The plates 138 and 140 include inner marginal portions 143 and 145, respectively, which define the bores 142 and 144, respectively, and which are disposed in the path of the falling articles A when the upper pair of stacking plates is in the stacking position illustrated in FIG. 8.

The lower stacking bar 120 includes, in each wall 173 of each bore 124, four equiangularly spaced apart vertical air escapement recesses 174 therethrough for allowing air, which escapes from beneath a falling trimmed article A in the direction of the arrow R, to freely pass vertically between the border B of the article and the wall 177 of the recesses 174. The upper bar 118 includes four identical equiangularly spaced air escapement recesses 178 therethrough which are axially aligned with the air escapement recesses 174 in the lower bar. As illustrated, the recesses 174 and 178 open into and are in free open fluid communication with the bores 122 and 124 of the bars 118 and 120, respectively, to allow the ambient air underlying a falling article A to pass laterally outwardly in the direction of the arrows R and thence upwardly through the vertical passages 174 and 178.

Figure 6:
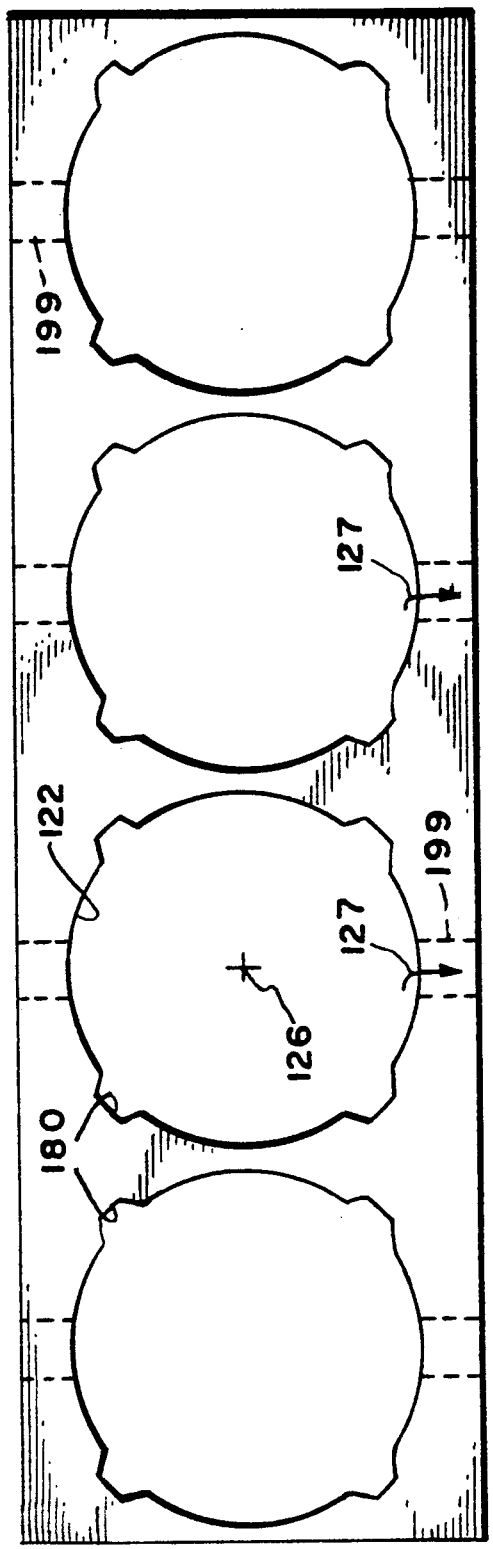
FIG. 6 is an enlarged top plan view of one of the lower horizontally movable stacking plates incorporated in the accumulator.

As illustrated in FIGS. 3 and 6, the plates 128, 130, 138 and 140 each include air escapement recesses 180 which are identical to and positioned to be in alignment with the passages and recesses 174 and 178 when the stacking plates are in the non-stacking position.

To aid in the escape of air from the undersides of falling articles A disposed in the bores 122 and 124, transverse passages 199 are provided through the side wall of the stacking bars 118 and 120 to allow the escapement air in the bores 122 and 124 to pass laterally outwardly therethrough in the direction of the arrows 127 (FIG. 6).

When the upper plates 138 and 140 are moved to the stacking positions illustrated in FIG. 8, the bore surrounding portions 143 and 145 will be disposed in the path of articles A passing through the bores 122 in the upper bar 118. The bores in the stacking plates 128, 130, 138 and 140 and the bars 118 and 120 are identical in size and shape.

The plate moving cylinders 150, 152, 162 and 164 are oppositely and alternately operated such that the positions of the plates alternate between that illustrated in FIG. 7 in which the lower two plates 128, 130 are allowed to accumulate articles on the stacking portions 146 and 148 and the positions illustrated in FIG. 8 in which the formed stack 184 of the articles A are allowed to drop and a partial stack 193 is allowed to form on the upper plate portion 143 and 145 which are now disposed in the path of the severed articles A.

The drive assembly 32 provided for operating the sheet supply mechanism 24 and trim die assembly 29 in timed relation includes a transverse shaft 186. The transverse shaft 186 is journaled in bearings 188 mounted on the frame members 20. The shaft 186 mounts a drive pulley 190 drivingly coupled to an electrically energized motor 192 via a belt 194. A reduced diameter gear 190a, which is fixed to the shaft 186, is drivingly coupled to gear 60a on shaft 56 via a chain 62. The crank arms 110 for moving the upper die platen 29 are coupled to sleeves 196 journaled on eccentric cams 198 fixed to the shaft 186. Because the shaft 186 and eccentric cams 198 rotate, the crank arms 110 will move the upper platen in a to-and-fro path of travel on the guide rods 100.

THE CIRCUIT

Figure 12:
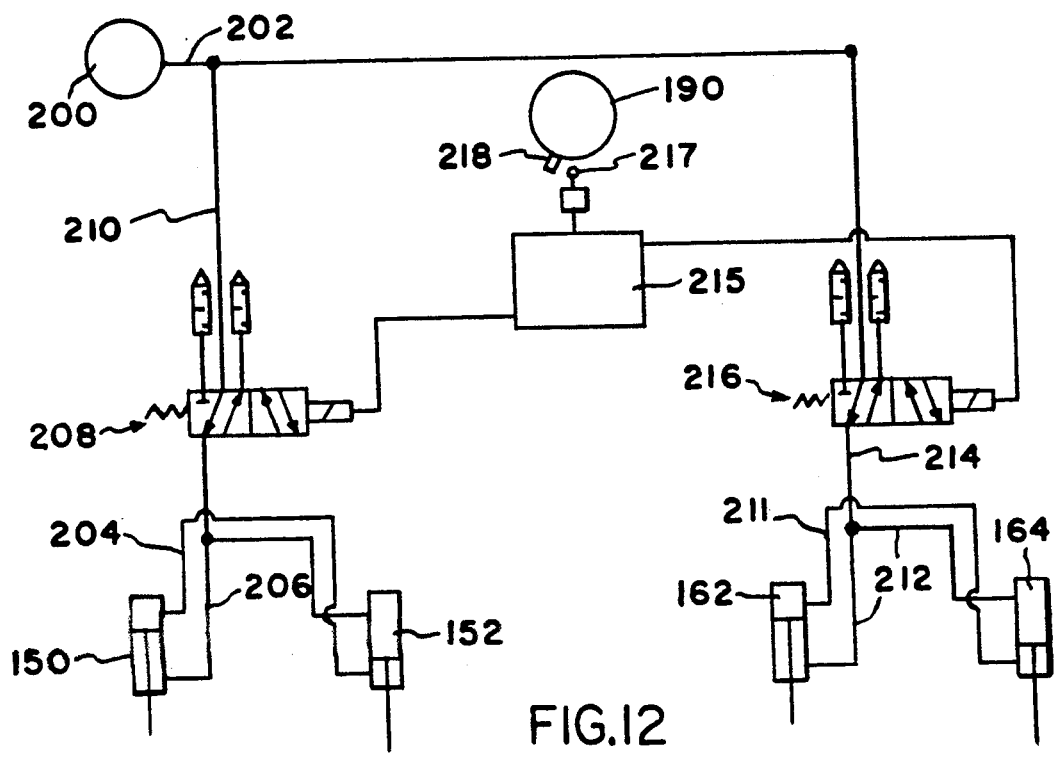
FIG. 12 is a schematic diagram of a pneumatic system for operating the apparatus illustrated in FIGS. 1-8.

Referring now more particularly to FIG. 12, a pneumatic diagram is illustrated and includes a source 200 of pressurized air coupled to a supply line 202. The power cylinders 150 and 152 are coupled in parallel circuit relation via lines 204 and 206 which in turn are coupled to a solenoid actuated valve, generally designated 208. The valve 208 is coupled to the source line 202 via a line 210. The condition of solenoid 208 can be alternated to alternately supply air from source 200 to line 204 or 206 depending on the position of the solenoid valve 208. As is clearly illustrated, the pistons 150 and 152 are oppositely operated so that there is a "push-pull" effect on the stacking plates 128 and 130.

The cylinders 162 and 164 for moving the upper stacking plates 138 and 140 are likewisely coupled in parallel circuit via a pair of lines 211 and 212. The cylinders 162 and 164 are oppositely operated to "push-pull" the upper plates 138, 140. The lines 211 and 212 are coupled to a line 214 coupled to the source 200 via solenoid actuated double acting valve 216 which can be alternately positioned to supply air to either line 211 or 212, as desired.

A counter timer 215 has a trip lever 217 which is actuated by a trip member 218 provided on the fly wheel 190. After the fly wheel 190 rotates a certain number of degrees and the lever 217 is actuated a predetermined number of times, depending on the amount of articles A to be stacked, the counter-timer 215 will actuate the solenoid 216 to move the upper set of stacking plates 138 and 140 from the non-stacking positions, illustrated in FIG. 7, to the stacking positions, illustrated in FIG. 8. The counter-timer 215 will cause the solenoid 208 to be actuated a short time after the solenoid 216 is actuated so that the cylinders 150 and 152 and the lower plates 128 and 130 operate slightly after the upper plates 138 and 140 are operated.

THE CONVEYOR

The conveyor 35 is disposed at a level below the accumulator or stacker 34 and includes a pair of side rails 220 mounted on end posts 222 and span by cross braces 224. A conveyor belt 226 is trained around end rollers 228 which are journaled on the side rails 220 via shaft 230. A belt or chain, schematically designated 232, couples the sprocket wheel 60a which is fixed to the shaft 56 to a sprocket 234 on the conveyor shaft 230.

METHOD AND THE OPERATION

Figure 2:
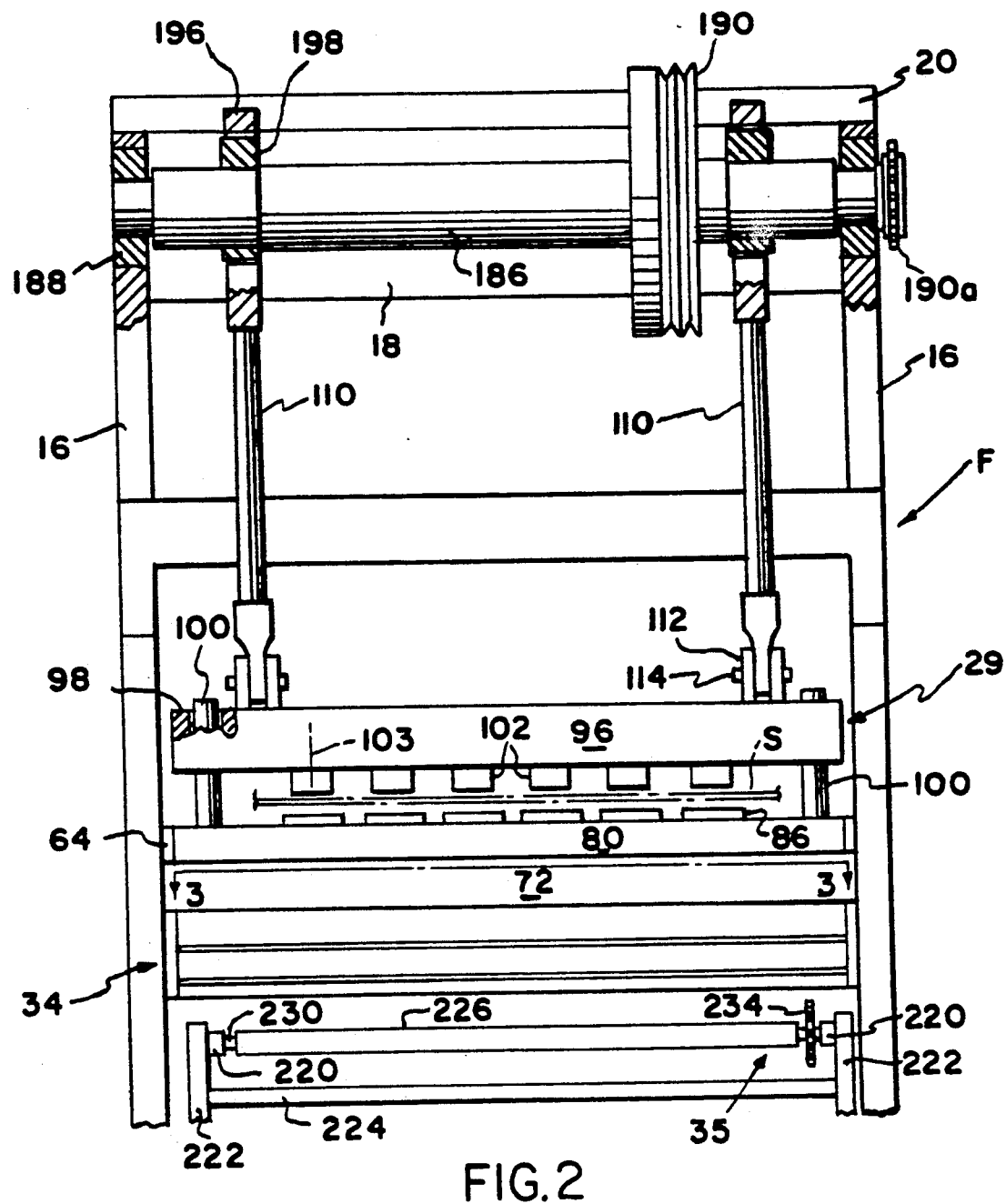
FIG. 2 is a slightly enlarged front elevational view of the apparatus illustrated in FIG. 1, with the sheet supply mechanism removed, parts being broken away in section to more clearly illustrate other parts of the apparatus.
Figure 5:
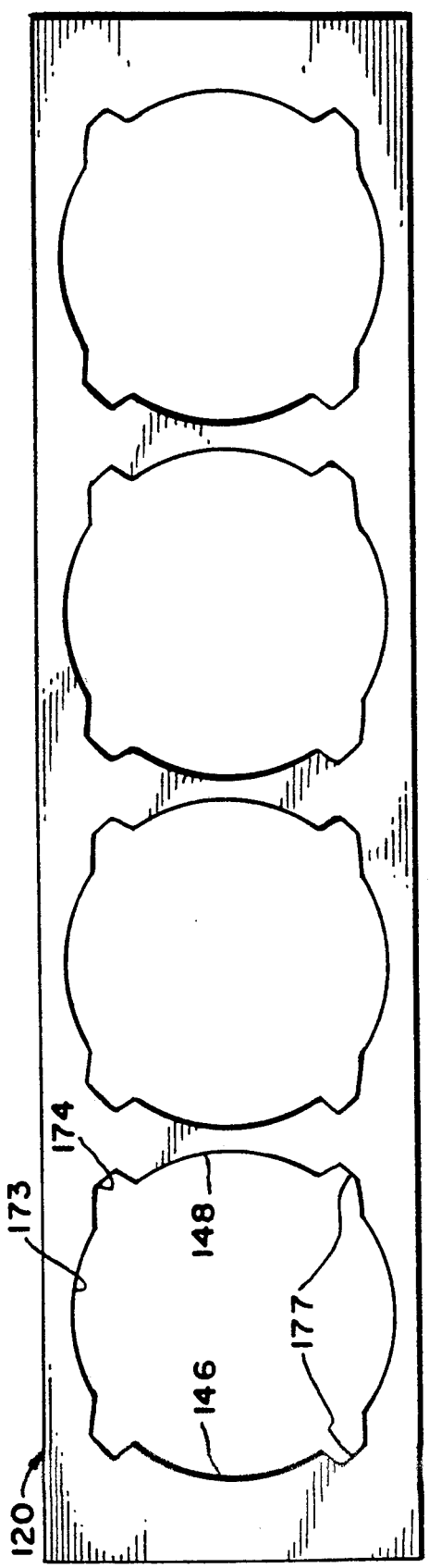
FIG. 5 is an enlarged top plan of the lower accumulator bar included in the accumulator.

It will be assumed that the accumulator or stacker 34 will initially be in the position illustrated in FIG. 7 in which the lower stacking plates are in the stacking positions and the inner marginal portions 146 and 148 of lower stacking plates 128 and 130, respectively, are disposed in the bores 124 and in the path of any trimmed falling articles A. It will further be assumed that the sheet S is in such position that articles A are at the trimmed station 26 and the upper platen 96 is in the uppermost, retracted, spaced apart position illustrated in FIG. 2 and in solid lines in FIG. 9. The upper trim die platen 96 will be moved downwardly to a closed trimming position so that the hollow trim die punches 102 and lower trim die 80 engage opposite sides of the sheet at the border B of the articles A to the position illustrated in chain lines in FIG. 9 and then to a still lower position in which the trim die punches are received by the platen openings 82 to sever the articles A at the trim station from the continuous sheet S of thermoplastic material. The articles A will fall through the accumulator bores 122 and 124 to be received by the marginal portions 146, 148 and the lower set of stacking plates 128 and 130. The upper platen 96 is retracted to its uppermost position illustrated in FIG. 2 and the sheet indexing assembly 24 is operated to index the sheets horizontally downstream to present the next successive set of articles A at the trim station 26. The upper platen 96 is again lowered and the operation is repeated until a predetermined number (i.e. 12) of severed articles A are allowed to accumulate on the marginal portions 132 and 134 of lower stacking plates 128 and 130 to form a stack 184.

As a trimmed article A is falling through the bores 122 and 124, ambient air will be forced radially outwardly, in the direction of the arrows R to the air escapement passages in the direction of the arrows R and thence outwardly through the apertures 199 in the direction of the arrows 127. The ambient air, represented by the arrows 127 will also pass into and upwardly through the air escapement passages 174, 178 and 180.

The counter timer 215 will be tripped via a cam 218, mounted on the fly wheel 190, which engages a lever 217 on the counter. The number of time the cam 218 trips the leaver 217 will be proportional to the number of articles A which have been trimmed. When a predetermined number is trimmed and counted and the stack 184 is formed, a signal will be sent from the counter-timer 215 to the solenoid valve 216 to cause pressurized air from source 200 to be directed to the cylinders 162 and 164 such that the cylinders 162 and 164 move the upper stacking plates 138, 140 from the non-stacking positions, illustrated in FIG. 7, to the stacking positions, illustrated in FIG. 8, to interrupt the flow of articles A and temporarily accumulate them thereon. A short time after solenoid valve 216 is actuated, the counter-timer 215 will energize solenoid valve 208 and cause pressurized air to be directed to the cylinders 150 and 152 such that the cylinders 150, 152 will move the lower set of stackings plates 128, 130 from the stacking positions, illustrated in FIG. 7, to the stack releasing positions, illustrated in FIG. 8, whereby the stack 184 is allowed to drop downwardly to be deposited onto the underlying conveyor belt 226.

When the upper plates 138, 140 are temporarily closed or in the stacking positions illustrated in FIG. 8, a partial stack 193, having a predetermined less number, i.e. 3-4, of articles will form thereon. When the previously formed and released stack 184 clears the accumulator, the counter-timer 215 will again oppositely actuate the solenoid valve 208 to signal the cylinders 150 and 152 to close or move the lower set of stacking plates 128, 130 from the non-stacking positions, illustrated in FIG. 8, to the stacking positions, illustrated in FIG. 7. A short time thereafter, a signal will be sent from the counter-timer to a solenoid valve 216 causing the valve pressurized air to be directed to cylinders 162, 164 so as to retract the upper set of stacking plates 138 and 140 to the non-stacking positions, illustrated in FIG. 7, whereby the partially formed stack 193 will drop to the lowermost plates 128 and 130. The operation will be continued until the predetermined number of articles are again stacked on the plates 128 and 130 and the operation will be repeated.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. A method of trimming and stacking articles which have been formed in a thermoplastic sheet from the sheet comprising the steps of:
   horizontally indexing a thermoplastic sheet in a horizontal path of travel to successively present successive articles in said sheet at a trim station;
   trimming the articles at said trim station from said sheet and allowing the severed articles to vertically free fall under the force of gravity;
   interrupting the vertical path of travel of said severed articles at a predetermined level and accumulating a predetermined number of said severed articles in a vertical stack at a stacking station; and
   releasing the stack for vertical free fall while concurrently interrupting the path of travel of severed articles at a higher predetermined level to accumulate additional severed articles in a successive partial stack at said higher predetermined level.

2. The method set forth in claim 1 wherein said step of releasing the stack while concurrently interrupting the severed articles at a higher level includes the step of horizontally moving a first support member from a stacking position in the path of travel of said severed articles to a non-stacking position out of said path of travel and horizontally moving a second support member, upstream of said first support member, from a remote position to a position in said path to interrupt and collect a predetermined lesser number of said articles in a partial stack while said first support member is in said non-stacking position.

3. The method set forth in claim 2 including the step of returning said second support member to said remote position and returning said first support member to said stacking position in response to said predetermined lesser number of articles accumulating on said second support member and allow said partial stack to free fall and be received by said first support member.

4. The method set forth in claim 1 wherein said step of releasing includes the step of forming a partial stack of articles at a predetermined vertical level above the level of said stacking station until said released stack vertically clears said stacking station and then releasing said partial stack for free-fall to said stacking station.

5. A method of trimming and stacking articles which have been formed in a sheet of thermoplastic material from the sheet comprising the steps of:
   horizontally indexing a thermoplastic sheet of material, having articles formed therein, in a horizontal path of travel to successively present successive articles in said sheet at a trim station;
   trimming the articles at said trim station from said sheet and allowing the severed articles to vertically free-fall under the force of gravity;
   interrupting the vertical travel of a predetermined number of articles at a predetermined level to accumulate a predetermined number of said severed articles to form a partial vertical stack;
   releasing the partial vertical stack for free-fall to a lower predetermined level and allowing the vertical passage of said articles at said predetermined level to accumulate a greater predetermined number of said severed articles to complete a vertical stack at said lower predetermined level; and
   downwardly releasing the completed vertical stack from said lower predetermined level for vertical free-fall under the force of gravity.

6. The method set forth in claim 5 wherein said interrupting step occurs to form said partial stack at said predetermined level when a previously formed stack is being released from said lower predetermined level.

7. A trim press for severing and stacking articles which have been integrally formed in a sheet of thermoplastic material from the sheet comprising:
   a frame;
   means on said frame for horizontally indexing a sheet of thermoplastic material, having articles formed therein, in a horizontal path of travel to a trim station;
   upper and lower trim dies mounted on said frame for relative vertical movement toward and away from each other between removed positions and trimming positions engaging vertically opposite sides of a sheet disposed therebetween to sever articles at said trim station and allow the articles to free fall; said dies in said removed positions being spaced apart a predetermined distance;
   said lower tim die including a vertical passage therethrough for receiving and vertically passing freely falling, trimmed articles; and
   accumulator means in vertical juxtaposition with said vertical passage for receiving and accumulating freely falling severed articles in vertically stacked relation to form a vertical stack of nested articles;
   said accumulator means including a storage member having a vertical stack receiving opening therethrough and air escapement passage means therein in fluid communication with said vertical opening to receive and pass ambient air escaping the undersides of said freely falling articles;
   said air escapement means includes at least one additional vertical passage in open fluid communication throughout its length in fluid communication with said vertical opening.

8. The trim press set forth in claim 7 wherein said air escapement means includes a transverse passage in fluid communication with said one additional vertical passage.

9. The trim press set forth in claim 7 wherein said accumulator means includes first article support means horizontally moveable between a blocking position disposed in the path of said freely falling severed articles at a predetermined level to allow the articles to accumulate in vertically stacked relation to form a nested stack and a non-blocking position to allow the nested stack to vertically fall.

10. The trim press set forth in claim 7 wherein said accumulator means includes second article support means disposed at a higher predetermined level and being horizontally moveable between a blocking position disposed in the path of said freely falling articles to interrupt the passage of articles at said higher predetermined level and a non-blocking position to allow the articles to pass to said first support means.

11. The trim press set forth in claim 10 including means for moving said first support means from said blocking position to said non-blocking position and moving said second support means from said non-blocking position to said blocking position.

12. The trim press set forth in claim 10 including means for alternately and oppositely moving said first and second support means between said blocking positions and non-blocking positions.

13. A trim press for severing and stacking articles which have been integrally formed in a sheet of thermoplastic material from the sheet comprising:

a frame;

means on said frame for horizontally indexing a sheet of thermoplastic material, having articles formed therein, in a horizontal path of travel to a trim station;

upper and lower trim dies mounted on said frame for relative vertical movement toward and away from each other between removed positions and trimming positions engaging vertically opposite sides of a sheet disposed therebetween to sever articles at said trim station and allow the articles to free fall, said dies in said removed positions being spaced apart a predetermined distance;

said lower trim die including a vertical passage therethrough for receiving and vertically passing freely falling, trimmed articles; and accumulator means in vertical juxtaposition with said vertical passage for receiving and accumulating freely falling severed articles in vertically stacked relation to form a vertical stack of nested articles;

said accumulator means including upper and lower storage bars having substantially identical, vertically aligned passages therethrough for receiving and vertically passing severed articles in a vertical path; and first stacking plate means mounted on an underside of said lower storage bar, having first passage means therethrough corresponding to said vertically aligned passages; means mounting said stacking plate means for horizontal movement between a blocking position in which a portion of said plate means is disposed in the vertical path of said severed articles to allow the articles to accumulate thereon to form a stack of a predetermined number of severed articles and a non-blocking position in which the stack of articles is allowed to freely fall through said first passage means;

said accumulator means including second stacking plate means disposed between said upper and lower storage bars and having second passage means therethrough corresponding to said vertically aligned passages; means mounting said second stacking plate means for movement between a blocking positions, in the path of said freely falling severed articles, when said first plate means is in said non-blocking position, and a non-blocking position allowing the severed articles to freely pass through said second passage means when said second plate means is in said blocking position.

14. The trim press set forth in claim 13 wherein said accumulator means includes air escapement passage means therein in fluid communication with said vertically aligned passages to pass ambient air escaping the undersides of said freely falling articles.

15. A trim press for severing and stacking articles which have been integrally formed in a sheet of thermoplastic material from the sheet comprising:

a frame;

means on said frame for horizontally indexing a sheet of thermoplastic material, having articles formed therein, in a horizontal path of travel to a trim station;

upper and lower trim dies mounted on said frame for relative vertical movement toward and away from each other between removed positions and trimming positions engaging vertically opposite sides of a sheet disposed therebetween to sever articles at said trim station and allow the articles to free fall; said dies in said removed positions being spaced apart a predetermined distance;

said lower trim die including a vertical passage therethrough for receiving and vertically passing freely falling, trimmed articles; and accumulator means in vertical juxtaposition with said vertical passage for receiving and accumulating freely falling severed articles in vertically stacked relation to form a vertical stack of nested articles;

said accumulator means including upper and lower storage bars having substantially identical, vertically aligned passages therethrough for receiving and vertically passing severed articles in a vertical path; and first stacking plate means mounted on an underside of said lower storage bar, having first passage means therethrough corresponding to said vertically aligned passages; means mounting said stacking plate means for horizontal movement between a blocking position in which a portion of said plate means is disposed in the vertical path of said severed articles to allow the articles to accumulate thereon to form a stack of a predetermined number of severed articles and a non-blocking position in which the stack of articles is allowed to freely fall through said first passage means;

said stacking plate means including a pair of horizontally disposed, vertically stacked plates having substantially identical openings moveable into and out of vertical registry with said vertical passages; and means for alternately and oppositely moving said pair of stacked plates.

16. Apparatus for trimming and stacking articles which have been formed in a sheet of thermoplastic material from the sheet comprising:

apparatus for horizontally indexing a thermoplastic sheet of material, having articles formed therein, in a horizontal path of travel to successively present successive articles in said sheet at a trim station;

upper and lower trim dies releatively vertically movable between vertically spaced apart positions and vertically closed positions engaging vertically opposite sides of said sheet to sever article at said trim station from said sheet and allow said severed articles to freely fall under the force of gravity;

partial stack forming means for interrupting the vertical travel of a predetermined number of freely falling, severed articles at a predetermined level to accumulate a predetermined number of said severed articles to form a partial vertical stack;

releasing and accumulating means for releasing the partial vertical stack for free fall to a lower predetermined level and allowing the vertical passage of said articles at said predetermined level to said lower predetermined level and accumulating a greater predetermined number of said severed articles to complete a vertical stack at said lower predetermined level; and means for releasing the completed vertical stack from said lower predetermined level for vertical free fall under the force of gravity.

17. The apparatus set forth in claim 16 wherein said means for interrupting the vertical path of travel includes first article support means movable between a non-blocking position and a blocking position in the vertical path of travel of said freely falling articles and means for moving said first article support means from said non-blocking position to said blocking position when said completed stack is released to interrupt the free-fall of articles and form a successive partial stack at said predetermined level.

18. The apparatus set forth in claim 16 wherein said releasing and accumulating means includes storage means having an article receiving vertical channel for receiving and vertically passing freely falling articles; said releasing and accumulating means including means for forming said completed vertical stack within said channel in said storage means; and means for operating said partial stack forming means to accumulate a partial stack when said releasing means releases said completed vertical stack for free-fall.

19. Apparatus for severing and vertically stacking articles which have been differentially pressure formed in a thermoplastic sheet comprising:

a frame;

means on said frame for successively horizontally indexing a thermoplastic sheet having articles formed therein in a horizontal path of travel to a trim station;

upper and lower trim platens, including upper and lower trim dies respectively, mounted on said frame on vertically opposite sides of said sheet at said trim station;

at least one of said upper and lower platens being vertically moveable toward and away from the other of said upper and lower platens between a vertical spaced position and a closed position in which said upper and lower trim dies engage upper and lower sides of said sheet to sever an article at said trim station from said sheet to provide a trimmed article severed from said sheet which free-falls under the force of gravity;

said lower trim die including a vertical opening therethrough for vertically receiving and passing said trimmed article as it free-falls;

said lower platen mounting said lower trim die having a vertical passage therethrough in alignment with said opening for vertically passing the free-falling trimmed articles; and accumulator means disposed below said trim dies for receiving a predetermined number of said free-falling trimmed articles, accumulating them to form a completed vertical stack, and then releasing said completed vertical stack;

said accumulator means including first interrupting means disposed at a predetermined level and moveable between a stack forming position in the path of said free falling severed articles to form a completed stack of a predetermined number of said articles and a stack releasing position to release said stack for vertical free-fall under the force of gravity, and second interrupting means disposed at a higher predetermined level and moveable between a remote position out of said path of said free-falling trimmed articles and an operative position disposed in said path to receive and store a partial stack of a predetermined lesser number of said articles while said first interrupting means is in said stack releasing position.

20. The apparatus set forth in claim 19 including means for moving said second interrupting means to said operative position and moving said first interrupting means to said stack releasing position and for moving said second interrupting means to said remote position and moving said first interrupting means to said stack forming position.

21. The apparatus set forth in claim 20 including counter means for counting the number of articles in said stack on said first interrupting means and said means for moving said first and second interrupting means operating in response to said counter means counting said predetermined number of articles accumulated in said stack on said first interrupting means.

22. The apparatus set forth in claim 19 wherein said accumulator means includes storage means including an article receiving and stack forming channel for receiving and passing said articles; said first and second interrupting means being operative to form said stack and said partial stack in said channel of said storage means.

* * * * *